Sept. 5, 1944.   W. H. MANNING   2,357,483
PRECIPITATION TYPE OIL CLEANER
Filed Jan. 23, 1942   2 Sheets-Sheet 2
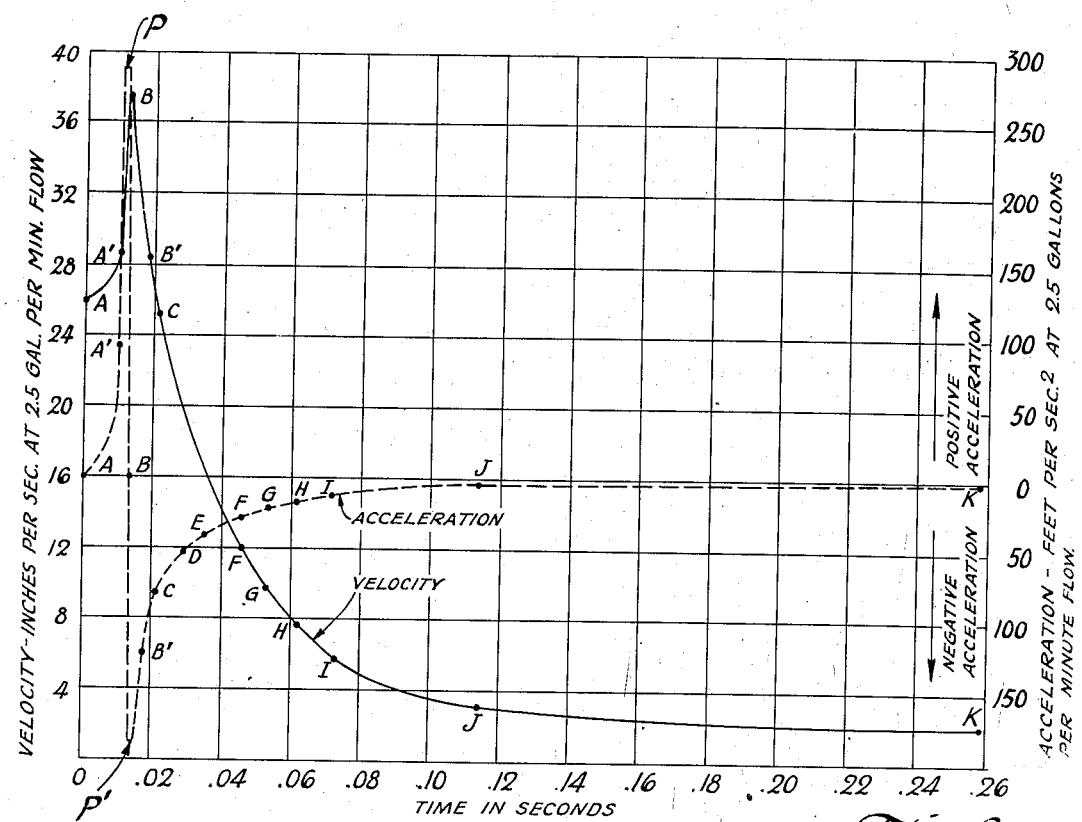
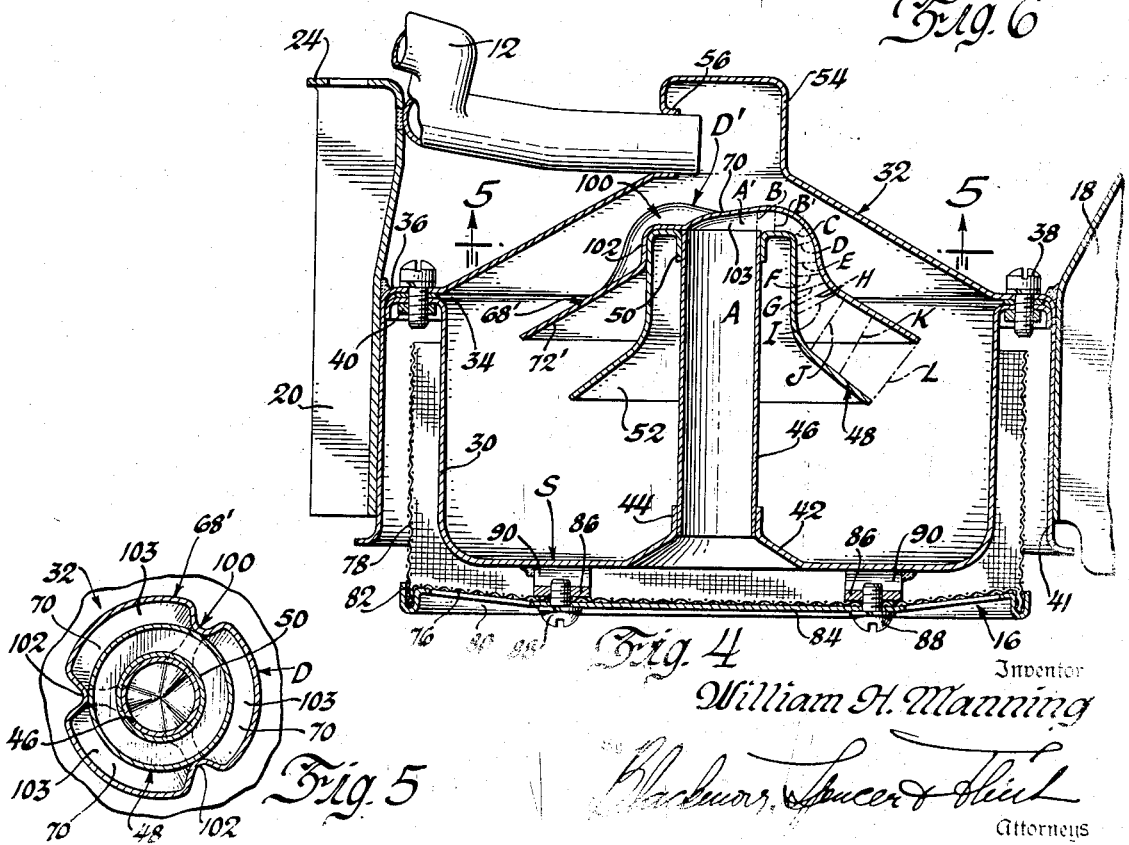
Inventor
William H. Manning
Attorneys Patented Sept. 5, 1944

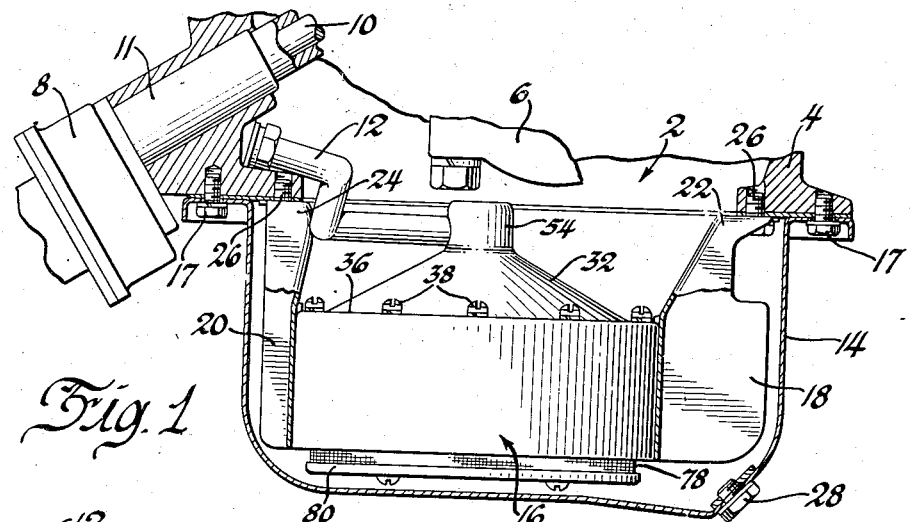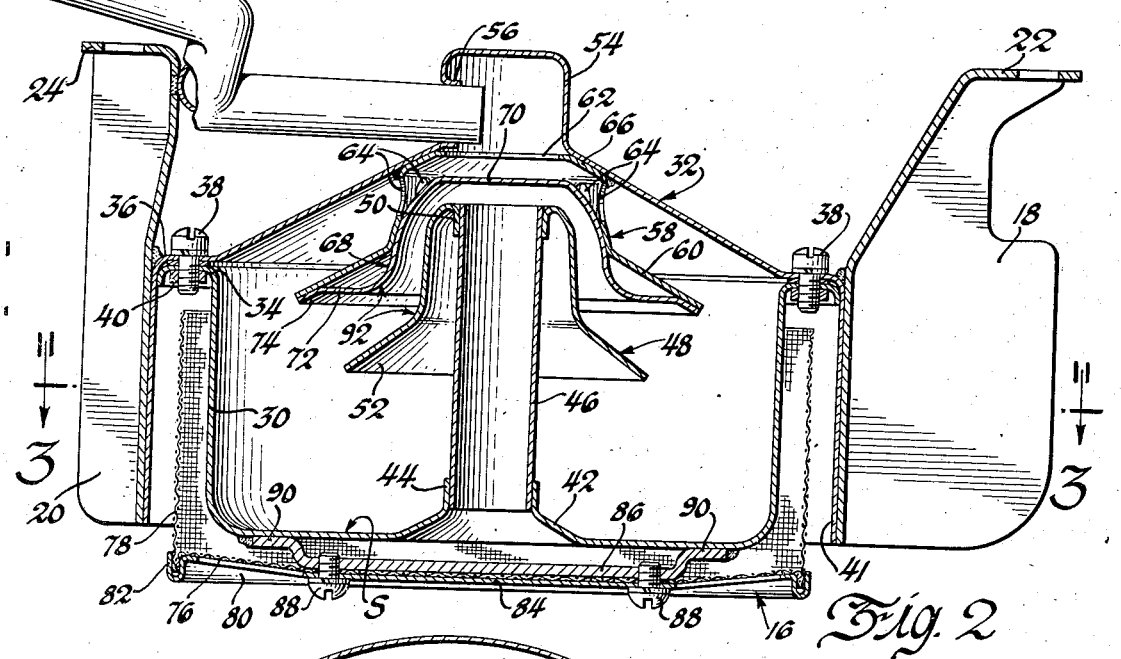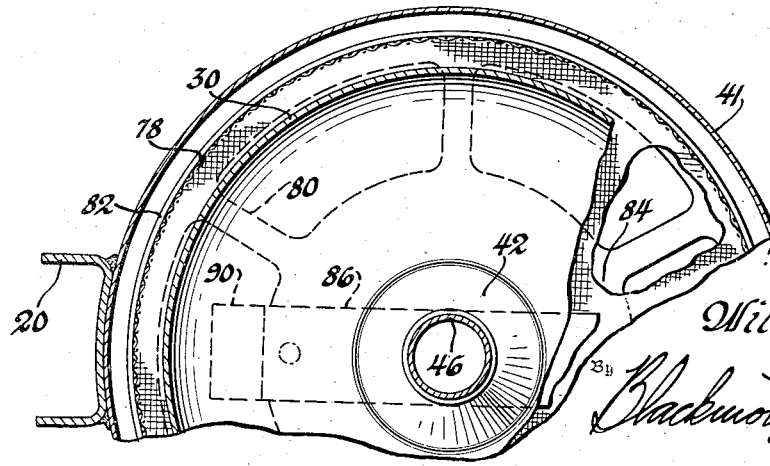

2,357,483

UNITED STATES PATENT OFFICE 2,357,483

PRECIPITATION TYPE OIL CLEANER

William H. Manning, Birmingham, Mich., assignor to General Motors Corporation, Detroit, Mich., a corporation of Delaware Application January 23, 1942, Serial No. 427,911

7 Claims. (Cl. 210—170)

This invention relates to oil cleaners, and has particular reference to an oil cleaner used in connection with the lubricating system of an internal combustion engine used on automotive vehicles; although it must be understood that the invention is equally useful for separating grit or other solid matter from any liquid, such as fuel oil.

The invention is an improvement over the disclosure in the application of Manning and Smart, Serial No. 354,654, filed August 29, 1940.

The object of the present invention is to provide a device for separating solid particles in suspension from a fluid, with flow control members adapted not only to control the direction of fluid flow through the device, but by confining the fluid to a streamlined path of flow of changing area to cause acceleration or deceleration of the rate of fluid flow in a particular way in particular parts of the device to effect a smooth and uniform change in the velocity of the fluid, such that the upward stream of fluid with solid particles in suspension flowing from the riser is deflected downwards in a confined annular streamlined path of gradually increasing cross sectional area in which its velocity is gradually reduced, and the solid particles of higher specific gravity and greater kinetic energy than the fluid are not reduced in velocity as quickly as the fluid but have a greater velocity downwards through the downward stream of fluid into quiescent fluid in the lower part of the cleaner for undisturbed gravitational precipitation therein, while the stream of cleaned fluid of greatly reduced velocity from which the particles have thus been freed is conducted from above said quiescent fluid upwards to its outlet.

Another object of the invention is a structure of the foregoing kind in which there is a smooth flow of fluid throughout the device, the cleaned fluid flowing upwards in an outer concentric annular stream with gradually increasing velocity, to a central outlet.

The above and other objects of the invention will be apparent as the description proceeds.

On the drawings:

Figure 1 is a sectional view through the oil pan and lower part of the crankcase of an internal combustion engine showing the oil cleaner in side elevation and supported therein.

Figure 2 is an enlarged mid-sectional detailed view of the oil cleaner. This view is four-fifths actual size.

Figure 3 is an enlarged cross-sectional detailed view taken substantially on the line 3—3 of Figure 2.

Figure 4 is a view similar to Figure 2 showing a modified and preferred arrangement of flow control elements.

Figure 5 is a section on the line 5—5 of Figure 4.

Figure 6 shows the velocity and acceleration curves of the oil as it passes into the cleaner of either Figure 2 or Figure 4.

Referring to the drawings, the numeral 2 indicates an internal combustion engine as a whole. The engine is provided with the usual crankcase 4, and at one side has the usual oil pump 8 driven from a shaft 10 mounted in a bearing 11 in the crankcase. The pump has the usual outlet (not shown) to deliver the oil to the parts to be lubricated, and is provided with the inlet pipe 12 which draws oil from the usual oil pan 14 through the oil cleaner indicated as a whole at 16. The oil pan is secured to the crankcase by means of the cap screws 17.

The oil cleaner has the lateral brackets 18 and 20 provided with the flanges 22 and 24. These flanges have suitable openings for the reception of screws 26 by means of which the oil cleaner is secured to the crankcase 4. The oil pan 14 is provided with the usual drain plug 28.

The oil cleaner is better shown in detail in Figure 2. The housing for the cleaner comprises the lower cup or settling chamber 30 closed by a frustro-conical shaped cover or top 32. The cup 30 has the rim flange 34 which mates with an annular flange 36 on the cover. The flanges 34 and 36 are secured together by means of the screws 38 threaded into the reinforcing ring. An annular wall 41 on the cover 32 extends downwardly around and is spaced from the cup 30.

The bottom central part of the cup 30 is provided with the inwardly extending frustro-conical shaped part 42 which terminates in an annular flange 44. A riser 46 is secured inside the flange 44 and extends upward beyond the top of the rim flange 34 and into the frustro-conical top 32 of the chamber 30.

A bell-shaped flow control element 48 has an opening in its top above its generally cylindrical upper portion, and an annular flange 50 around said opening. The top of the riser 46 is received in the flange 50 and rigidly secured thereto. Below its generally cylindrical part the flow control member 48 has a downwardly and outwardly flared frustro-conical skirt 52.

The cover 32 is provided with a dome 54, provided with an opening having an inturned flange 56, and in the flange 56 there is received the end of the outlet pipe 12 leading to the pump 8.

Secured inside the cover 32 and immediately below the dome 54 there is a stamping indicated as a whole at 58. This stamping has the broad downwardly and outwardly flared frustro-conical rim 60, the top outlet opening 62, and a plurality of side openings 64. The stamping 58 is secured to the cover 32 by welding at the zone indicated at 66, and within it is secured a bell-shaped member 68 which is thereby suspended with its top 70 over the top of the riser 46. The member 68 has a flared rim 72 terminating in a downwardly and outwardly flared part 74 where it joins the downwardly and outwardly flared rim 60 of the member 58.

Together the members 58 and 68 constitute a generally bell-shaped flow reversing bonnet and flow control member which extends downwardly around the upper end of the riser 46 and concentrically over the flow control member 48, as best shown in Figure 2. The flow reversing bonnet cooperates with the member 48 to provide a generally downward streamlined annular path of gradually increasing cross sectional area therebetween.

The bottom and sides of the cup 30 are suitably protected by the screens 76 and 78 respectively, the screen 78 extending into the space between the cup 30 and the wall 41. These screens are secured together by means of a spider 80 having the outer U-shaped flanged edge 82 holding the two screens together. The center 84 of the spider is solid and is secured to a bridge plate 86 by means of the screws 88. The plate 86 has the feet 90 which are secured to the bottom of the cup 30 by welding.

Referring to Figure 4, the parts corresponding to the species of Figure 2 are given similar numerals and letters. The essential difference in this species over that shown in Figure 2 is that the upper flow reversing bonnet indicated at 68' in Figure 4 is supported on the inlet riser 46. This flow-reversing bonnet is generally bell-shaped and has the outwardly flared part 72' which is spaced from the flared part 52 of the lower flow-control skirt 48 to form therebetween the diverging passage for the flow of the oil. The upper part of the flow-reversing bonnet 68' has a dome D' which is provided with three indentations 100 spaced 120° apart. In these indentations there are formed the shoulders 102 which fit over and are welded to the top of the cylindrical part of the flow control member 48 to hold the two members in accurately spaced relation one to the other. Between the indentations 100 the skirt 48 and bonnet 68' are spaced from each other as is shown by the spaces 103 in Figures 4 and 5, and the stamping 58 is entirely eliminated, so that a more definite spacing is always assured between the skirt and the bonnet.

The two exemplifications of the invention illustrated show merely minor structural variations one over the other. They are alike in function and operate as follows:

The stream of oil with solid particles in suspension flowing upward from the inlet riser 46 against the head 70 of the flow reversing bonnet 68 or 68' is first sharply accelerated and then sharply reduced in velocity so that its velocity is sharply increased and then sharply decreased as it is deflected outwards before it is deflected downwards between the members 68 or 68' and 48 in a concentric annular stream with a gradually reducing velocity and a minimum of turbulence, and the solid particles of higher specific gravity in the stream of oil from the riser 46, partaking of the first sharp outward acceleration, having greater kinetic energy than the oil, and partly because they have a greater rebound momentum from the deflecting means, are not subsequently reduced in velocity as quickly as the oil but have a greater velocity downwards through the downward stream of oil into quiescent oil in the lower part of the chamber 30 for undisturbed gravitational precipitation therein, while the stream of cleaned oil of reduced velocity from which the particles have thus been freed flows over the quiescent oil and around the rim of the bell-shaped flow reversing member 58, 68 or 68' to be conducted upwards between this member and the top 32 of the chamber with a gradually increasing velocity in an outer concentric annular stream, to the central outlet in the top 32.

It should be especially noted that the skirt 52 of the member 48 is either wholly or partially below the level of quiescent fluid in the chamber 30 and that the velocity of that part of the fluid stream which is nearest to the skirt 52 will have a velocity which, if not actually nil, will at most be considerably lower than the reduced velocity of the whole of the stream flowing around the rim of the bell-shaped flow reversing member, and will not pick up the particles of solid matter which may impinge onto the skirt 52, before they fall therefrom to the bottom of the chamber 30.

In Figure 6 there is plotted the acceleration and velocity curves of the oil as it passes into the cleaner. The abscissas are indicated in time units; the ordinates for the velocity in inches per second at 2.5 gallons per minute flow, and in feet per second, per second at 2.5 gallons per minute flow for the acceleration. In Figure 4 there has been indicated by the letters A, A', B, B', C, D, E, F, G, H, I, J, K, L, various cross-sectional locations in the annular path of flow of the oil which is between the flow-reversing and control elements 48 and 68 or 68' and it will be appreciated that since this path is an annular one, its actual area at these locations is not proportional to the lengths of the indicating lines but is a function of the radius of the annulus at these points. While these letters and the locations are not indicated on the species of Figure 2, nevertheless the explanation thereof and operation is the same for both figures.

The letter A designates the cross-sectional area of the stand-pipe or riser 46, and is used as the starting point for both the acceleration and the velocity curves. Referring to the velocity curve, in the normal operation of the pump the point A will start at about 26 on the left ordinate of Figure 6. As the oil passes beyond the top of the riser and against the baffle 70 at the upper part of the flow-reversing bonnet 68 or 68', or at A', the cross-sectional area of the oil flow is much less and therefore there is a rapid increase in the velocity of the oil, so that the velocity curve will rise from A to A'. The acceleration will likewise increase from zero at section A to about 90 at section A'. The velocity and the acceleration continue to increase until the oil reaches the area at B. When the oil reaches the cross sectional part B, the area of the flow path is again substantially the same as that of the riser or stand-pipe, and the velocity becomes constant, and therefore the acceleration will drop to zero. When the cross-sectional area at B' is reached, where the area of the passage is greater, the velocity will drop to point B' on the curve in Figure 6. The velocity at the points of increasing cross-sectional area indicated by the reference letters C to K inclusive is indicated by the corresponding points on the velocity curve, and by the time the point K is reached the velocity has become constant. Referring now to the acceleration curve beyond the point B, due to an increase in area of the path of flow the velocity will decrease, and there is a deceleration or a negative acceleration of the oil flow, and the acceleration curve then suddenly drops from the upper peak at P through zero to the lower peak at P' (about −190), or below the zero line indicating deceleration. The peak at P' indicates the maximum deceleration, and as the path of flow gradually increases beyond the top of the riser, the deceleration of the oil flow at the sections B', C, D, E, F, G, I, J and K, will gradually diminish as is indicated by the corresponding points on the deceleration curve. When the area at K is reached the deceleration will again be zero as the velocity of flow is then constant at about 5% of the average velocity at section B.

From cross-sectional area K to cross-sectional area L at the outer extremities of the reversing and flow-control members 48 and 68 or 68', the oil stream flows outward over the quiescent oil therebelow and around the outer rim of the members 68 or 68' to flow upwards in an outer annular stream to its outlet. It is at this point of reversal of flow that the oil is freed of solid particles in suspension while the stream of cleaned oil is gradually accelerated upwards to leave the outlet at substantially the same velocity as the entering uncleaned oil flows upward through the riser 46.

In the cleaner according to the invention as used on the Pontiac automobile for its 1942 models, and to which the curves of Figure 6 apply, the following dimensions are used:

| | Inches |
|---|---|
| Inside diameter of riser (a) | 2²⁰⁄₃₂ |
| Distance between outer edges of flow-reversing and control members (L—L) | 20⁰⁄₃₂ |
| Outer diameter of flare of lower flow-control member | 2²⁴⁄₃₂ |
| Outer diameter of flare of upper flow-reversing member | 3¹⁹⁄₃₂ |
| Vertical height of lower flow-control member | 1¹⁰⁄₃₂ |
| Vertical height of upper flow-reversing member | 1 ⁴⁄₃₂ |
| Inside diameter of dome of lower flow-control member | 1¹²⁄₃₂ |

With the above sizes used on this type of precipitation filter very remarkable and satisfying results were obtained by actual and oft-repeated tests, which clearly demonstrated that the action of precipitation of the foreign matter from the oil is definitely facilitated and controlled by the reversal, gradual deceleration and acceleration of flow, and in this regard must not be confused with the action of settling chambers and baffle plates or partitions when they are not specifically co-related to direct and control the oil flow.

An outstanding advantage of the present precipitation type cleaner is that it has sufficient capacity within reasonable dimensions that when applied to an automobile engine, it may be in circuit with all the lubricating oil passing through the engine instead of handling only a lessor part. The usual installations of filter or screen type of cleaner are capable of handling only a lesser part of the flowing oil while the greater part is bypassed around them.

In the present cleaner tests show that grit, such as metal particles or fine sand that will pass through an 80-mesh screen but will hold on a 100-mesh, is precipitated with the following efficiencies:

| Rate of flow in gals. per min. (engine speed) | Temperature | Efficiency |
|---|---|---|
| | °F. | Pct. |
| 0.5 | 140 | 84 |
| 1.5 | 190 | 69 |
| 2.5 | 250 | 77 |
| 1.5 | 250 | 85 |
| 0.5 | 250 | 92 |

The oil used was S. A. E. 20 run at the temperature indicated by starting at low speed at 140° F. and then as the speed increased the temperature rose to a maximum of 250° F. and remained there while the engine speed reduced as the car was decelerated, all as occurs in normal automobile driving.

I claim:

1. Means for precipitating solids from a liquid, comprising a settling chamber having a central inlet riser, a flared skirt depending from the upper periphery of said riser, a bell-shaped bonnet fixedly supported above said riser and directing the liquid flowing therethrough in a reverse direction downwardly about said skirt and into said settling chamber, said bell-shaped bonnet being spaced from the top of said riser and the flared skirt to form a streamlined annular flow control path of gradually increasing cross-sectional area therebetween, and an outlet for said chamber above said bonnet.

2. An oil cleaner, comprising a closed cylindrical chamber, a central inlet riser forming an oil inlet to said chamber, a flared skirt coaxial with and extending downwards and outwards from the upper part of said riser, a bell-shaped bonnet fixedly supported above said riser and having a flared rim cooperating with said flared skirt to provide a path of changing cross sectional area therebetween, through which the oil flowing from said riser is first accelerated and increased in velocity, then rapidly decelerated as it flows radially outwards, and then gradually decreased in velocity as it flows downwards and outwards into said chamber; and an oil outlet conduit at the top of said chamber.

3. An oil cleaner comprising a container, a downwardly flared bell-shaped skirt fixed in said container, a bell-shaped bonnet fixed above said skirt to provide an annular passage enclosed by the diverging walls of said skirt and bonnet, an inlet conduit opening coaxially into said annular passage, said conduit skirt and bonnet being so arranged as to cause oil from said conduit to first flow radially with relatively high velocity, next downward and then outward with gradually decreasing velocity, then upward to the top of said container, and an outlet conduit at the top of said container.

4. The combination according to claim 3, in which the top of the bell shaped bonnet is so spaced from the inlet conduit that the cross section therebetween is less than the cross section of said conduit.

5. The combination according to claim 3, in which the container has a top wall of conical shape cooperating with the bell shaped bonnet to conduct cleaned fluid upwards to a central outlet.

6. An oil cleaner comprising a cylindrical container, a central vertical inlet conduit, a flared skirt supported around the upper end of said inlet conduit, a bonnet fixed above said conduit and skirt having a flared rim defining an annular passage of increasing width from the upper to the lower extremity thereof whereby the oil flow is first increased in velocity radially, then directed downward and outward with gradually decreasing velocity, an oil outlet at the top of said container, and means for causing continuous flow of oil through said container.

7. An oil cleaner comprising a domed container, a central vertical inlet conduit in said container, spaced conical baffles coaxial with said inlet conduit enclosing therebetween a path of flow first radially outward, then downward and outward with increasing cross section, an outlet from the top of said container, and means for causing continuous flow through said container.

WILLIAM H. MANNING.